United States Patent
Shinoda et al.

(10) Patent No.: US 8,808,903 B2
(45) Date of Patent: Aug. 19, 2014

(54) BATTERY WITH WOUND ELECTRODE GROUP AND POSITIVE AND NEGATIVE ELECTRODE INSULATING COVERS

(75) Inventors: Tatsuya Shinoda, Saku (JP); Hideyuki Ishii, Maebashi (JP); Kengo Kurata, Saku (JP); Yoshiaki Asami, Niiza (JP); Tsutomu Matsui, Saku (JP); Eiki Kashiwazaki, Kashiwazaki (JP); Kenichi Takahashi, Saku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 477 days.

(21) Appl. No.: 13/165,011

(22) Filed: Jun. 21, 2011

(65) Prior Publication Data
US 2011/0311851 A1    Dec. 22, 2011

(30) Foreign Application Priority Data

Jun. 21, 2010 (JP) .................... 2010-141007
Sep. 30, 2010 (JP) .................... 2010-223219
Apr. 4, 2011 (JP) .................... 2011-082952

(51) Int. Cl.
*H01M 2/00* (2006.01)
(52) U.S. Cl.
USPC .................. 429/163; 429/170; 429/168
(58) Field of Classification Search
USPC .......................... 429/163, 170, 168
See application file for complete search history.

(56) References Cited

U.S. PATENT DOCUMENTS

| 2004/0191612 | A1 | 9/2004 | Akita et al. | |
| 2006/0024568 | A1 | 2/2006 | Lee | |
| 2006/0024578 | A1* | 2/2006 | Lee | 429/208 |
| 2006/0051664 | A1* | 3/2006 | Tasai et al. | 429/161 |
| 2011/0052976 | A1 | 3/2011 | Ishii et al. | |
| 2011/0081573 | A1* | 4/2011 | Kim et al. | 429/186 |

FOREIGN PATENT DOCUMENTS

| CN | 1728432 A | 2/2006 |
| EP | 2 333 866 A1 | 6/2011 |
| JP | 2004-119199 | 4/2004 |
| JP | 2009-87542 | 4/2009 |
| JP | 2009-87720 | 4/2009 |

OTHER PUBLICATIONS

Extended European Search Report issued Mar. 21, 2012, in European Patent Application No. 11170506.7.
Partial European Search Report issued Oct. 12, 2011, in Patent Application No. 11170506.7.
Extended European Search Report issued Nov. 29, 2013 in Patent Application No. 12188997.6.
Combined Chinese Office Action and Search Report issued Aug. 23, 2013 in Patent Application No. 201110179094.X with English Translation.

* cited by examiner

*Primary Examiner* — Zachary Best
(74) *Attorney, Agent, or Firm* — Oblon, Spivak, McClelland, Maier & Neustadt, L.L.P.

(57) ABSTRACT

According to one embodiment, there is provided a battery. The battery includes a metallic outer can, a wound electrode group, a positive electrode-lead, a negative electrode-lead, a positive electrode insulating cover, and a negative electrode insulating cover.

18 Claims, 15 Drawing Sheets

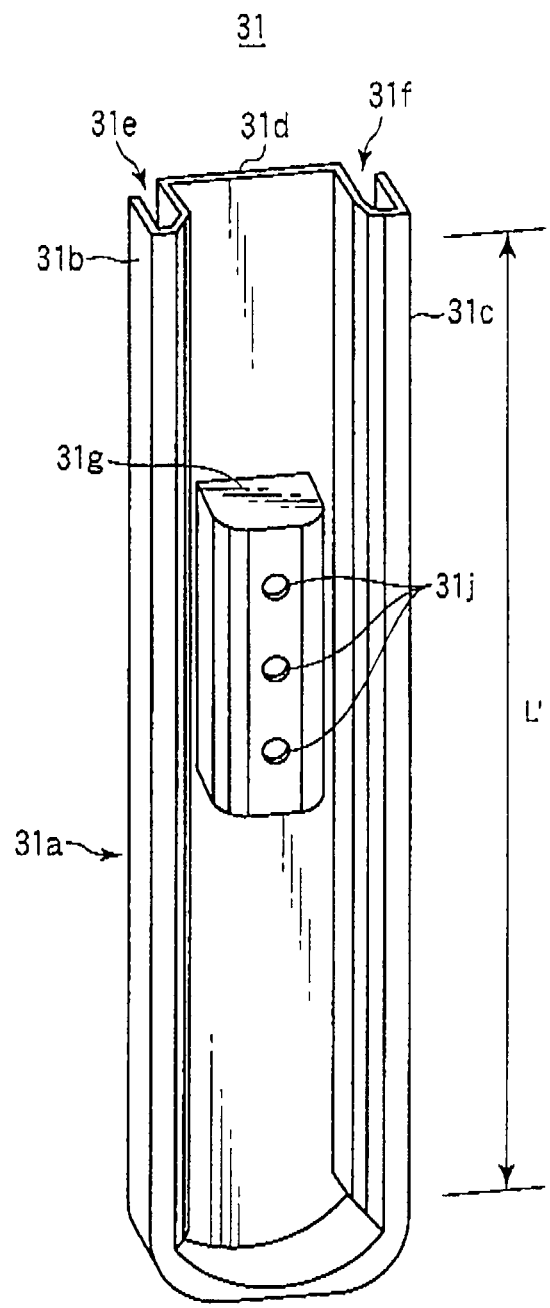
F I G. 13

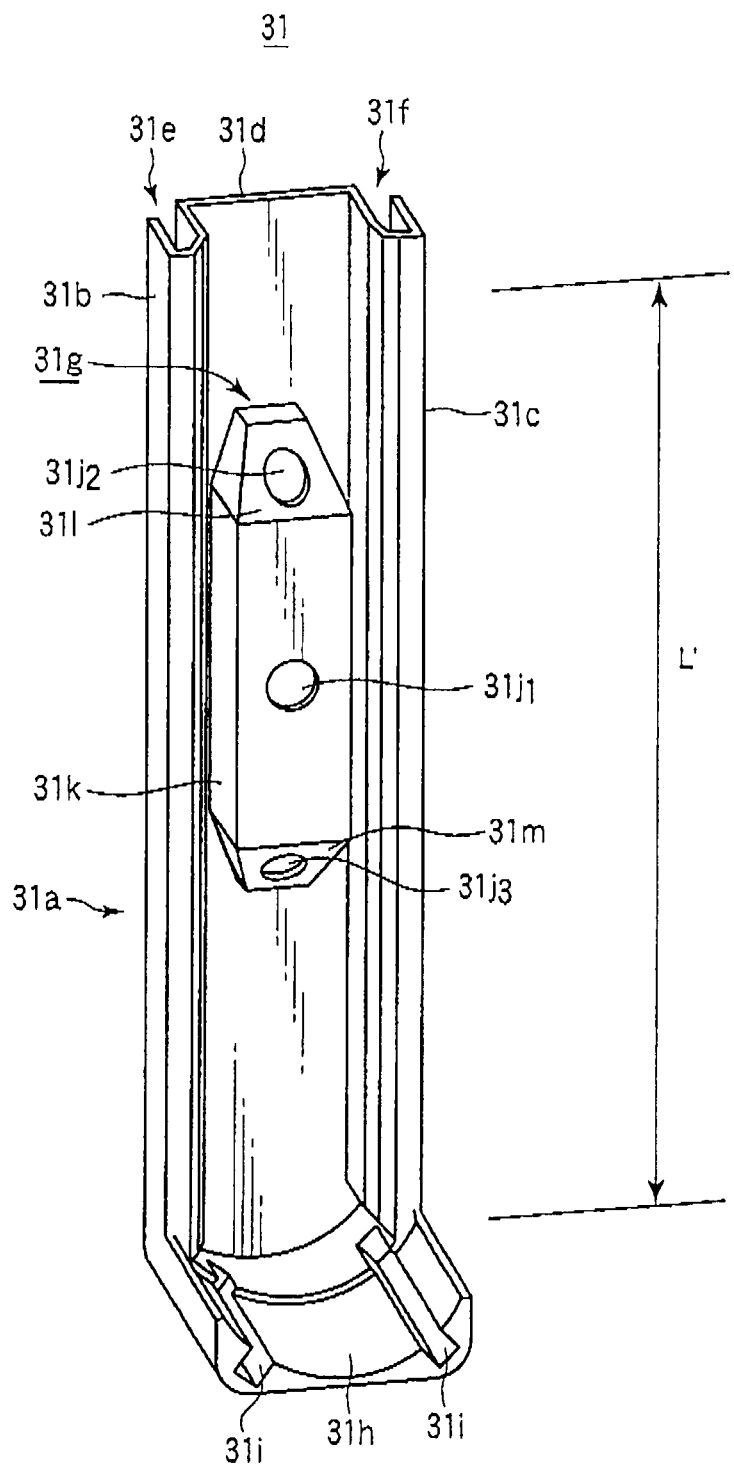
F I G. 16

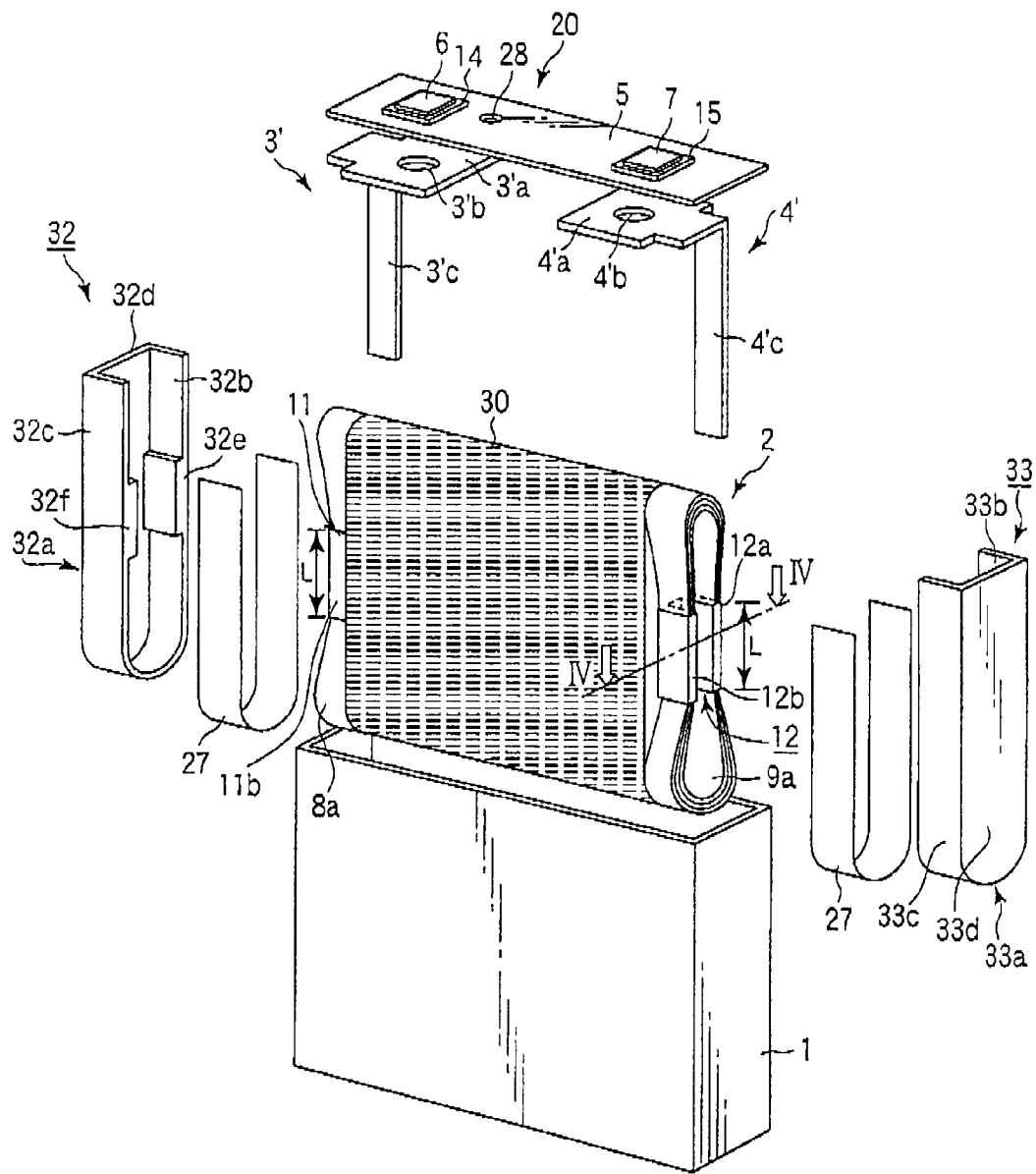
F I G. 17

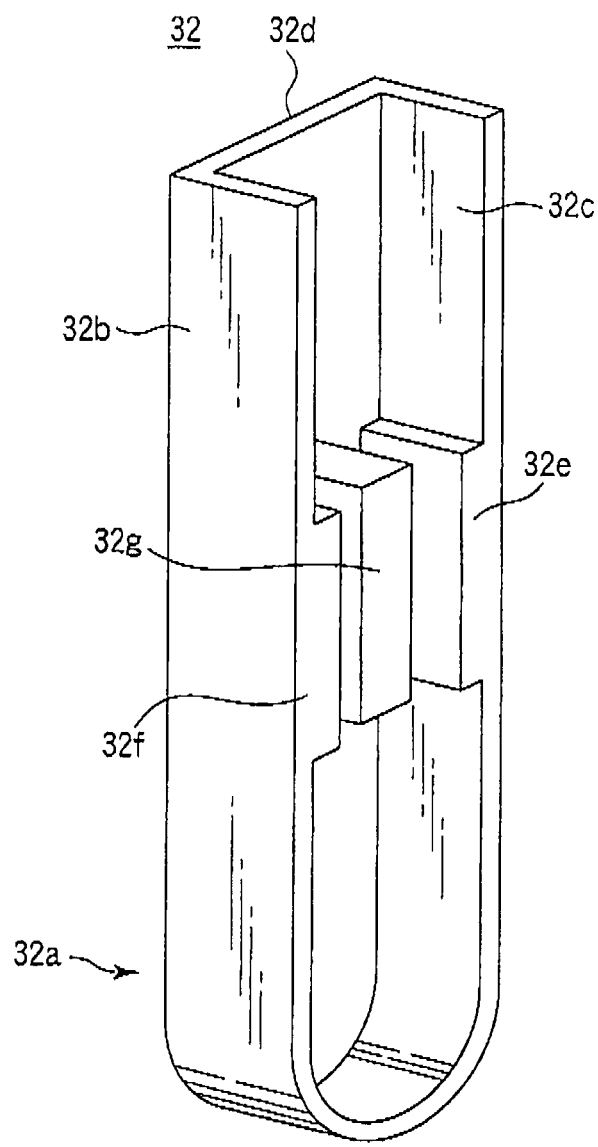
F I G. 18

BATTERY WITH WOUND ELECTRODE GROUP AND POSITIVE AND NEGATIVE ELECTRODE INSULATING COVERS

CROSS-REFERENCE TO RELATED APPLICATIONS

This application is based upon and claims the benefit of priority from Japanese Patent Applications No. 2010-141007, filed Jun. 21, 2010; No. 2010-223219, filed Sep. 30, 2010; and No. 2011-082952, filed Apr. 4, 2011, the entire contents of all of which are incorporated herein by reference.

FIELD

Embodiments described herein relate generally to a battery.

BACKGROUND

Since lithium ion secondary batteries have high energy densities, they are expected to be used for power sources for electric cars, hybrid vehicles, electric motorcycles, forklifts, and the like. In order to obtain an electric power source having a larger capacity, an assembled battery has been developed by connecting a plurality of batteries.

The lithium ion secondary battery includes a metallic outer can, a wound electrode group accommodated in the outer can, leads, and a metallic lid attached to an opening portion of the outer can. For example, the lid is welded to the opening portion of the outer can. A positive electrode current-collecting tab is provided at one end in a winding axis direction of the wound electrode group. A negative electrode current-collecting tab is provided at the other end thereof. The positive electrode current-collecting tab is connected with a positive electrode-lead. The negative electrode current-collecting tab is connected with a negative electrode-lead. The lid is equipped with a positive electrode terminal and a negative electrode terminal. These terminals are fixed to the lid by caulking. For example, a gasket becomes caught between these terminals and the lid, so that the terminals are insulated from the lid and the outer can. The positive and negative electrode-leads connected with the current-collecting tabs are respectively connected to the terminal of the positive electrode and the terminal of the negative electrode.

When the current-collecting tabs or the leads come into contact with the outer can of the battery, and in particular, in a case where it is an assembled battery, the outer can gets a high voltage, and there is the possibility of increasing danger of electric leak and electric shock to a person. Accordingly, a structure for insulating the outer can from the current-collecting tabs and the leads has been considered. However, in a case where vibration, shock, or the like is applied to the battery, there is the possibility that the current-collecting tabs and the leads may come into contact with the outer can. Alternatively, in a case where the leads are disconnected from the current-collecting tabs of the electrode group due to, e.g., vibration, shock, or the like, the leads may come into contact with the electrode group, and there is the possibility of causing short circuit.

BRIEF DESCRIPTION OF THE DRAWINGS

FIG. 13 is a perspective view illustrating a second modification of the insulating cover used for the battery according to the second embodiment;

FIG. 16 is a perspective view illustrating a fifth modification of the insulating cover used for the battery according to the second embodiment;

FIG. 17 is an exploded perspective view illustrating a rectangular secondary battery according to a third embodiment; and FIG. 18 is a perspective view illustrating a modification of the insulating cover used for the battery according to the third embodiment.

DETAILED DESCRIPTION

A battery according to an embodiment will be hereinafter explained in detail.

The battery according to the embodiment comprises a metallic outer can, a wound electrode group accommodated in the outer can in a direction perpendicular to a winding axis, wherein a wound positive electrode current-collecting tab is provided at one end of the wound electrode group, and a wound negative electrode current-collecting tab is provided at the other end of the wound electrode group, a positive electrode-lead connected to the positive electrode current-collecting tab, a negative electrode-lead connected to the negative electrode current-collecting tab, a metallic lid comprising a positive electrode terminal and a negative electrode terminal and being attached to an opening portion of the outer can, a positive electrode insulating cover engaged with one end portion including the positive electrode current-collecting tab of the wound electrode group, and a negative electrode insulating cover engaged with the other end portion including the negative electrode current-collecting tab of the wound electrode group. The positive electrode-lead comprises a connection portion connected to the positive electrode terminal and first and second sandwiching portions extending from the connection portion to the wound electrode group in the direction perpendicular to the winding axis to sandwich the wound positive electrode current-collecting tab. The negative electrode-lead comprises a connection portion connected to the negative electrode terminal and first and second sandwiching portions extending from the connection portion to the wound electrode group in the direction perpendicular to the winding axis to sandwich the wound negative electrode current-collecting tab. The positive electrode insulating cover comprises a U-shaped member having first and second sidewalls facing each other, a back surface member, and a sandwiching member for sandwiching the first sandwiching portion of the positive electrode-lead and the wound positive electrode current-collecting tab portion facing the first sandwiching portion and sandwiching the second sandwiching portion of the positive electrode-lead and the positive electrode current-collecting tab portion facing the second sandwiching portion. The negative electrode insulating cover comprises a U-shaped member having first and second sidewalls facing each other, a back surface member, and a sandwiching member for sandwiching the first sandwiching portion of the negative electrode-lead and the wound negative electrode current-collecting tab portion facing the first sandwiching portion and sandwiching the second sandwiching portion of the negative electrode-lead and the negative electrode current-collecting tab portion facing the second sandwiching portion.

First Embodiment

Figure 1:
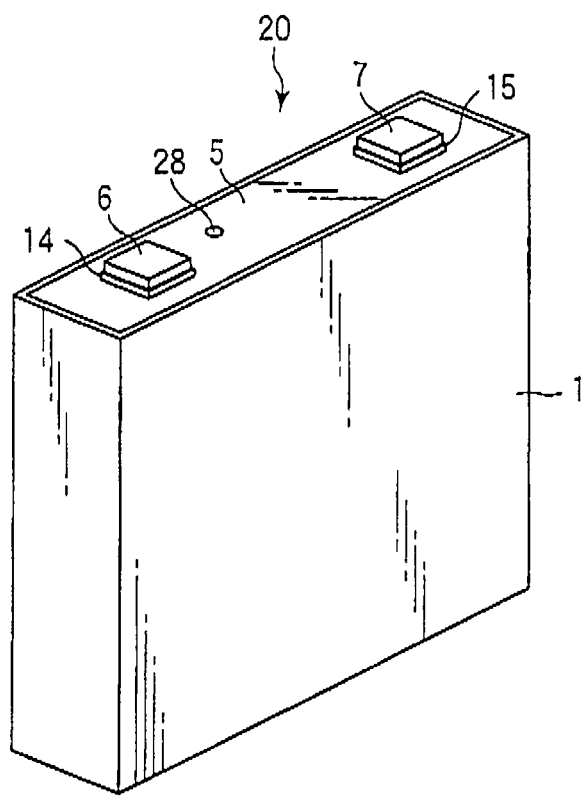
FIG. 1 is a perspective view illustrating an external of a rectangular secondary battery according to a first embodiment.
Figure 2:
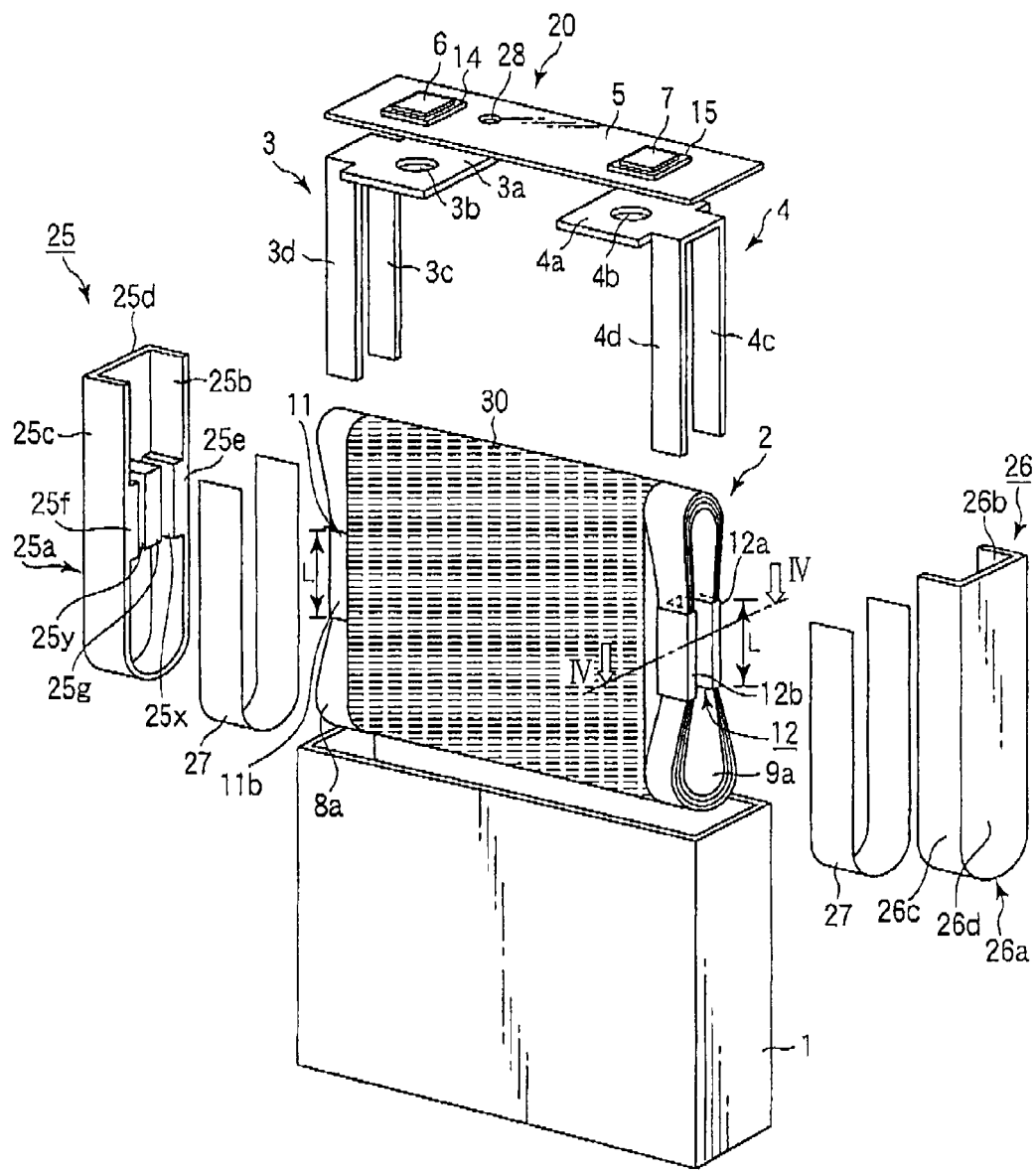
FIG. 2 is an exploded perspective view illustrating the battery of FIG. 1.

The embodiment will be hereinafter explained with reference to drawings. FIGS. 1 and 2 show a sealed rectangular non-aqueous electrolyte secondary battery 20 as an example of a non-aqueous electrolyte secondary battery. The battery 20 comprises an outer can 1, a flat-shaped wound electrode group 2, a positive electrode-lead 3, a negative electrode-lead 4, a positive electrode insulating cover 25, and a negative electrode insulating cover 26, and a lid 5.

For example, the outer can 1 is formed in a rectangular tube shape having a bottom, and is made of metal such as aluminum, aluminum alloy, iron, and stainless steel. The wound electrode group 2 is accommodated in a direction perpendicular to a winding axis in the outer can 1.

Figure 3:
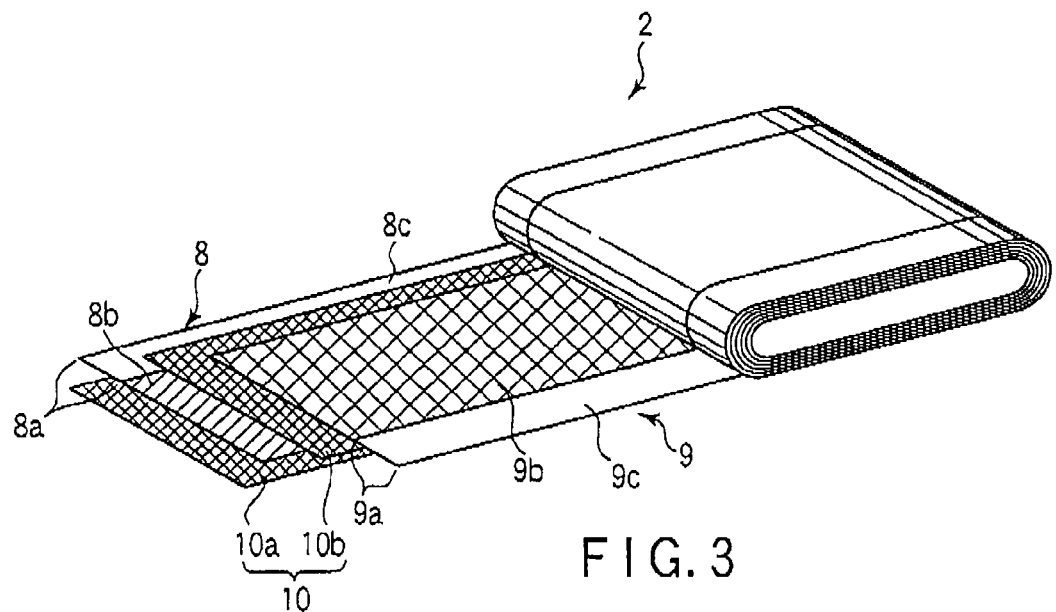
FIG. 3 is an exploded perspective view illustrating an electrode group used for the battery of FIG. 1.

A positive electrode current-collecting tab 8a is provided at one end of the wound electrode group 2. A negative electrode current-collecting tab 9a is provided at the other end thereof. FIG. 3 is an exploded perspective view illustrating the wound electrode group 2. The positive electrode 8 comprises a positive electrode current-collecting body 8c in a belt shape made of, e.g., a metal foil and a positive electrode active material layer 8b formed on one surface or both surfaces thereof. The positive electrode active material layer 8b is formed such that a region having a certain width (non-coated portion) remains at one end side in a longitudinal direction of the belt-shaped positive electrode current-collecting body 8c. This non-coated portion is a portion in which the positive electrode current-collecting body 8c is exposed, and this serves as the positive electrode current-collecting tab 8a. Likewise, the negative electrode 9 comprises a negative electrode current-collecting body 9c in a belt shape made of, e.g., a metal foil and a negative electrode active material layer 9b formed on one surface or both surfaces thereof. The negative electrode active material layer 9b is formed such that a region having a certain width (non-coated portion) remains at the other end side in a longitudinal direction of the belt-shaped negative electrode current-collecting body 9c (at the side opposite to the one end of the positive electrode 8). This non-coated portion is a portion in which the negative electrode current-collecting body 9c is exposed, and this serves as the negative electrode current-collecting tab 9a.

The positive electrode 8 and the negative electrode 9 are stacked alternately with the belt-shaped separators 10a, 10b. At this occasion, the positive electrode current-collecting tab 8a is provided at one end side in the winding axis direction, and the negative electrode current-collecting tab 9a is provided at the other end side. The separator 10a stacked below the positive electrode 8 is arranged such that one end of the separator 10a in the longitudinal direction thereof is located at an inner side with respect to the end portion of the positive electrode 8 at the side of the positive electrode current-collecting tab. Accordingly, the positive electrode current-collecting tab 8a protrudes from the positive electrode active material layer 8b, the negative electrode active material layer 9b, and the separator 10a, which constitute the wound electrode group 2. The separator 10a is arranged such that the other end of the separator 10a in the longitudinal direction thereof is located at an outer side with respect to the other end of the positive electrode 8. The separator 10b sandwiched between the positive electrode 8 and the negative electrode 9 is arranged such that one end in the longitudinal direction is located at an inner side with respect to the end portion of the negative electrode 9 at the side of the negative electrode current-collecting tab. Accordingly, the negative electrode current-collecting tab 9a protrudes from the positive electrode active material layer 8b, the negative electrode active material layer 9b, and the separator 10b, which constitute the wound electrode group 2. The separator 10b is arranged such that the other end of the separator 10b in the longitudinal direction thereof is located at an outer side with respect to the other end of the negative electrode 9.

The flat-shaped wound electrode group 2 is formed by stacking and winding the separator 10a, the positive electrode 8, the separator 10b, and the negative electrode 9 and subsequently pressing them.

As shown in FIG. 2 most clearly, the wound electrode group 2 is attached by an insulating tape 30. The insulating tape 30 covers the outermost periphery of the wound electrode group 2 except for the current-collecting tab, so as to insulate the outermost periphery except for the current-collecting tab. The insulating tape 30 may be wound one or more times.

The metallic lid 5 is fixed, in an air tight manner, to the opening portion of the outer can 1 by, e.g., welding. The positive electrode terminal 6 and the negative electrode terminal 7 fixed to the lid 5 by caulking. The insulating gaskets 14, 15 become caught between these terminals and the lid. The positive electrode terminal 6 and the negative electrode terminal 7 respectively protrude from the back surface of the lid 5 to the inside of the outer can 1. The method for fixing the positive electrode terminal 6 and the negative electrode terminal 7 comprises not only caulking with the insulating gaskets 14, 15 but also hermetic seal using glass.

The positive electrode-lead 3 comprises a connection plate 3a, a penetrating hole 3b, and first and second sandwiching strips 3c, 3d. The connection plate 3a is a connection portion connected to the positive electrode terminal 6. The penetrating hole 3b is formed in the connection plate 3a. The first and second sandwiching strips 3c, 3d are sandwiching portions branched off from the connection plate 3a and extending to the wound electrode group 2 in a direction perpendicular to the winding axis. The connection plate 3a is in contact with the back surface of the lid 5 at the portion of the positive electrode terminal 6 with an insulating sheet (not shown) interposed therebetween, and the positive electrode terminal 6 protruding from the back surface of the lid 5 is fixed with the penetrating hole 3b by caulking.

The positive electrode current-collecting tab 8a is sandwiched by the first and second sandwiching strips 3c, 3d of the positive electrode-lead 3 from the direction perpendicular to the winding axis, and the first and second sandwiching strips 3c, 3d and the positive electrode current-collecting tab 8a are connected by, e.g., welding.

Likewise, the negative electrode-lead, 4 comprises a connection plate 4a, a penetrating hole 4b, and first and second sandwiching strips 4c, 4d. The connection plate 4a is a connection portion connected to the negative electrode terminal 7. The penetrating hole 4b is formed in the connection plate 4a. The first and second sandwiching strips 4c, 4d are sandwiching portions branched off from the connection plate 4a and extending to the wound electrode group 2 in the direction perpendicular to the winding axis. The connection plate 4a is in contact with the back surface of the lid 5 at the portion of the negative electrode terminal 7 with an insulating sheet (not shown) interposed therebetween, and the negative electrode terminal 7 protruding from the back surface of the lid 5 is fixed with the penetrating hole 4b by caulking.

The negative electrode current-collecting tab 9a is sandwiched by the first and second sandwiching strips 4c, 4d of the negative electrode-lead 4 from the direction perpendicular to the winding axis, and the first and second sandwiching strips 4c, 4d and the negative electrode current-collecting tab 9a are connected by, e.g., welding.

It should be noted that the above welding may be carried out according to methods such as resistance welding and ultrasonic welding.

The leads of the positive/negative electrodes having the above structure enable the first and second sandwiching strips to be arranged equally with respect to the current-collecting tabs. Further, since there are two (first and second) sandwiching strips, the current collection distance is short. This improves the balance of current collection, and improves the efficiency of current collection. Further, in the leads having the first and second sandwiching strips as explained above, heat is less likely to be concentrated at a joint portion between the current-collecting tab and the first and second sandwiching strips and at the leads themselves, and therefore, even in a case where a large current is passed therethrough, good electrical characteristics can be maintained.

The leads of the positive/negative electrodes and the current-collecting tabs of the positive/negative electrodes may be connected while the current-collecting tabs are partially fixed with fixing members as shown in FIG. 2. In other words, the positive electrode current-collecting tab 8a is fixed with the fixing member 11, and the negative electrode current-collecting tab 9a is fixed with the fixing member 12.

The fixing members of the positive/negative electrodes have the same shape as each other, and they are arranged symmetrically when current-collecting tabs of the positive/negative electrodes are fixed. Therefore, the fixing member 12 for fixing the negative electrode current-collecting tab 9a will be explained in detail as an example with reference to FIG. 4. Since the negative electrode current-collecting tab 9a is wound, it is made of a bundle in a shape of hollow prolate ellipsoid in which a plurality of current-collecting tabs are overlapped. The fixing member 12 has first and second holding units 12a, 12b and a coupling unit 12c. The first and second holding units 12a, 12b are in a U shape, and are respectively engaged with two portions facing each other in the minor axis direction of the hollow prolate ellipsoid in proximity to a central portion of the negative electrode current-collecting tab 9a, thus binding the negative electrode current-collecting tab 9a. The coupling unit 12c is in a flat shape, and couples the first and second holding units 12a, 12b with each other within the ellipsoid formed by the negative electrode current-collecting tab 9a. The negative electrode current-collecting tab 9a is connected with the first and second holding units 12a, 12b by, e.g., welding.

Figure 4:
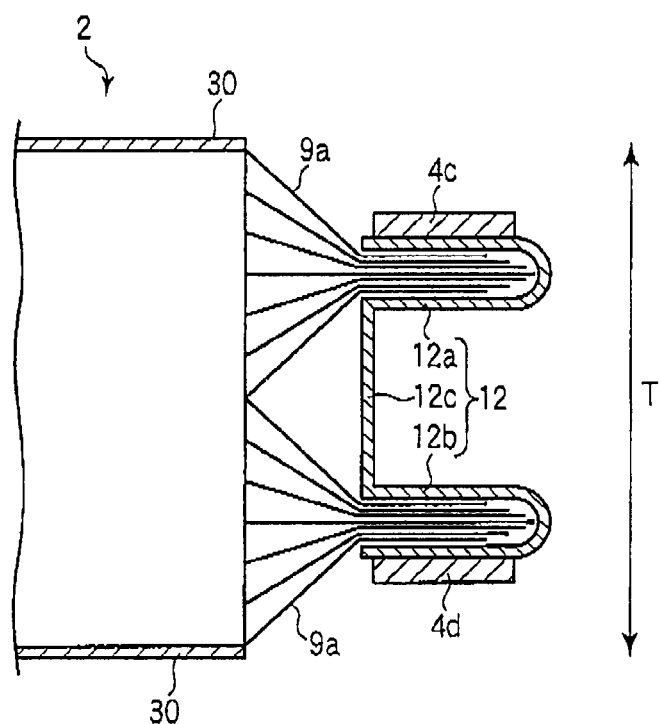
FIG. 4 is a cross sectional view illustrating a cross section taken along line IV-IV of FIG. 2 when the cross section is seen from a direction of an arrow.

The negative electrode current-collecting tab 9a attached with the fixing member 12 is sandwiched by the first and second sandwiching strips 4c, 4d of the negative electrode-lead 4. Therefore, as shown in FIG. 4, the first sandwiching strip 4c is in contact with the external surface of the first holding unit 12a, and the second sandwiching strip 4d is in contact with the external surface of the second holding unit 12b. In these contact portions, the first and second sandwiching strips 4c, 4d and the first and second holding units 12a, 12b are connected by, e.g., welding.

It should be noted that the above welding may be carried out according to methods such as resistance welding and ultrasonic welding.

The thicknesses of the first and second holding units 12a, 12b are desirably thinner than the thicknesses of the first and second sandwiching strips 4c, 4d of the leads 4. When the thicknesses of the first and second holding units 12a, 12b are reduced, they can be easily fixed to predetermined two portions of the negative electrode current-collecting tab 9a. In addition, this facilitates coupling between the negative electrode current-collecting tab 9a, the first and second holding units 12a, 12b, and the first and second sandwiching strips 4c, 4d of the leads. Further, this can reduce the resistance at the joint portion between the first and second holding units 12a, 12b and the negative electrode current-collecting tab 9a.

It should be noted that a length between the first sandwiching strip 4c and the second sandwiching strip 4d of the lead 4 is defined as being shorter than a length T in a thickness direction of the wound electrode group 2.

The fixing member 12 is made of a metallic conductive material. Therefore, the negative electrode 9 of the wound electrode group 2 is electrically connected to the lead 4 via the fixing member 12, and is further electrically connected to the negative electrode terminal 7 of the lid 5 via the lead 4.

Using the above fixing member, the thickness of the portion of the current-collecting tab of the wound electrode group 2 is reduced, so that a space for arranging the lead within the outer can be ensured. Since it is not necessary to newly arrange a space for the lead, this improves the energy density of the battery 20.

It should be noted that the fixing member may have only first and/or second holding units, and may have no coupling unit. The first and second holding units are in a U shape.

The structure of the fixing members 11 and the fixing form of the positive electrode current-collecting tab 8a with the fixing members 11 are the same as those of the above fixing member 12 and the negative electrode current-collecting tab 9a. It should be noted that the fixing members 11 comprise U-shaped holding units 11a, 11b and a flat coupling unit 11c.

Insulating covers 25, 26 of the positive/negative electrodes are respectively engaged with both end portions including the current-collecting tabs of the wound electrode group 2 sandwiched by the first and second sandwiching strips of the leads of the positive/negative electrodes, and the insulating covers 25, 26 cover these sandwiching strips and the current-collecting tabs.

The current-collecting tabs of the positive/negative electrodes and the insulating covers of the positive/negative electrodes covering the leads sandwiching the current-collecting tabs have the same shape as each other and are arranged symmetrically. Therefore, the negative electrode insulating cover 26 covering the negative electrode current-collecting tab 9a and the first and second sandwiching strips 4c, 4d of the negative electrode-lead 4 are explained in detail as an example with reference to FIGS. 2 and 5.

Figure 5:
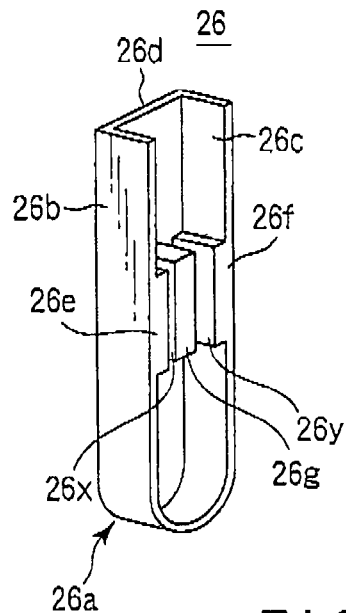
FIG. 5 is a figure illustrating a negative electrode insulating cover used in the battery according to the first embodiment.

As shown in FIGS. 2 and 5, the negative electrode insulating cover 26 comprises a U-shaped member 26a, a back surface member 26d, and a sandwiching member. The U-shaped member 26a has first and second sidewalls 26b, 26c facing each other. The back surface member 26d is integrated with the back surface of the U-shaped member 26a. The sandwiching member sandwiches the negative electrode current-collecting tab 9a and the first and second sandwiching strips 4c, 4d of the negative electrode-lead 4. A lower portion of the U-shaped member 26a is bent, and an upper portion thereof is open. The U-shaped member 26a is made such that the side opposite to the back surface member 26d is also open.

The sandwiching member comprises first and second rectangular thick portions 26e, 26f respectively arranged in proximity to central portions of the first and second sidewalls 26b, 26c and a rectangular protruding portion 26g arranged on the back surface member 26d. The protruding portion 26g is provided with predetermined clearances (a first clearance 26x, a second clearance 26y) from the first and second thick portions 26e, 26f. The protruding portion 26g and the first and second thick portions 26e, 26f are in a lengthwise direction of the first and second sidewalls 26b, 26c, and have the same length. The length of protrusion of the protruding portion 26g from the back surface member 26d is less than the width of the sidewalls 26b, 26c of the U-shaped member 26a. It should be noted that the protruding portion 26g may be in a hollow shape.

The negative electrode insulating cover 26 is engaged with an end portion including the negative electrode current-collecting tab 9a of the wound electrode group 2. Accordingly, the bent lower portion of the U-shaped member 26a is in contact with the lower portion of the negative electrode current-collecting tab 9a, and the first and second sidewalls 26b, 26c of the U-shaped member 26a are in contact with the first and second sandwiching strips 4c, 4d of the negative electrode-lead 4 sandwiching the negative electrode current-collecting tab 9a.

Figure 6:
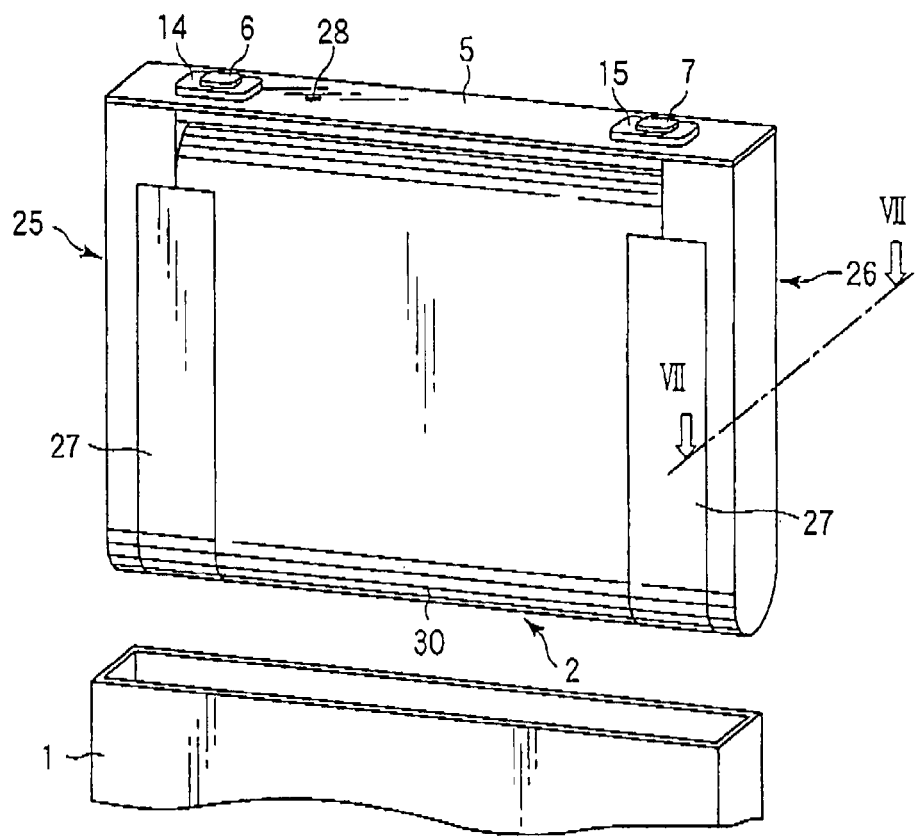
FIG. 6 is a perspective view illustrating a step for inserting the electrode group of the battery of FIG. 1 into an outer can.
Figure 7:
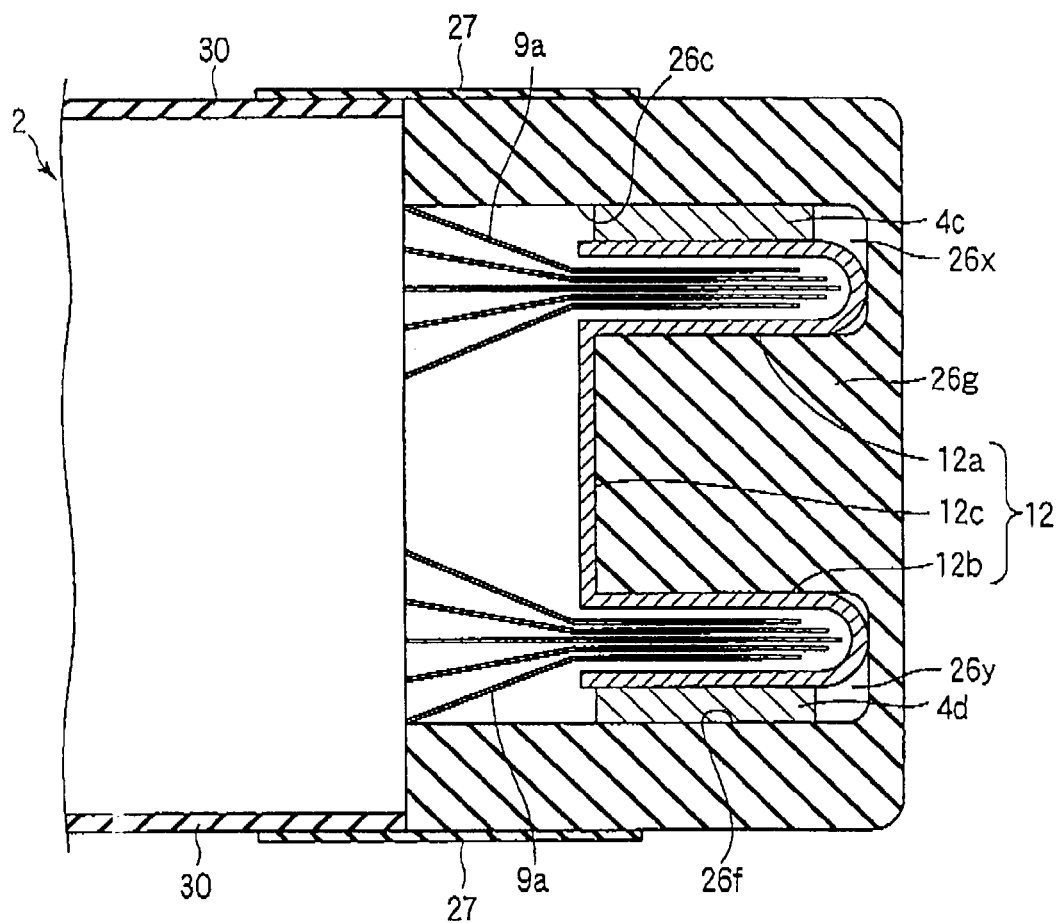
FIG. 7 is a cross sectional view illustrating a cross section taken along line VII-VII of FIG. 6 when the cross section is seen from a direction of an arrow.

As shown in FIGS. 6 and 7 (in which the fixing member 12 is attached), the negative electrode current-collecting tab 9a bound and fixed by the first holding unit 12a and the first sandwiching strip 4c of the negative electrode-lead 4 in contact with the outer surface of the first holding unit 12a are inserted into and sandwiched by the first clearance 26x between the first thick portion 26e and the protruding portion 26g of the sandwiching member. On the other hand, the negative electrode current-collecting tab 9a bound and fixed by the second holding unit 12b and the second sandwiching strip 4d of the negative electrode-lead 4 in contact with the outer surface of the second holding unit 12b are inserted into and sandwiched by the second clearance 26y between the second thick portion 26f and the protruding portion 26g of the sandwiching member. In other words, when the first holding unit 12a and the first sandwiching strip 4c are inserted into the first clearance 26x, the first holding unit 12a and the first sandwiching strip 4c are sandwiched by elastic force provided by the first thick portion 26e and the protruding portion 26g forming the first clearance 26x. Likewise, when the second holding unit 12b and the second sandwiching strip 4d are inserted into the second clearance 26y, the second holding unit 12b and the second sandwiching strip 4d are sandwiched by elastic force provided by the second thick portion 26f and the protruding portion 26g forming the second clearance 26y.

The negative electrode insulating cover is preferably integrally molded from resin, and is formed using an insulating material. Examples of materials may include polypropylene, polyimide, polyphenylene sulfide (PPS), and polyester (PET). In particular, it is desirable to be formed from polypropylene in view of heat resistance, insulation, and cost.

The positive electrode insulating cover 25 has the same structure as the negative electrode insulating cover 26. The relationship between the positive electrode insulating cover 25 and the end portion of the wound electrode group 2 including the positive electrode current-collecting tab 8a is the same as the relationship between the negative electrode insulating cover 26 and the end portion of the wound electrode group 2 including the negative electrode current-collecting tab 9a. The positive electrode insulating cover 25 comprises a U-shaped member 25a, a back surface member 25d, and a sandwiching member. The U-shaped member 26a has first and second sidewalls 25b, 25c facing each other. The back surface member 25d is integrated with the back surface of the U-shaped member 25a. The sandwiching member sandwiches the positive electrode current-collecting tab 8a and the first and second sandwiching strips 3c, 3d of the positive electrode-lead 3. The sandwiching member comprises first and second rectangular thick portions 25e, 25f respectively arranged in proximity to central portions of the first and second sidewalls 25b, 25c and a rectangular protruding portion 25g arranged on the back surface member 25d. The protruding portion 25g is provided with predetermined clearances (a first clearance 25x, a second clearance 25y) between the first and second thick portions 25e, 25f.

In the battery according to the embodiment as described above, the current-collecting tabs and the leads are covered with the insulating covers made of the insulating material. Therefore, the wound electrode group 2 is insulated from the outer can 1. Further, since the joint portion between the current-collecting tab and the lead is sandwiched by the sandwiching member of the insulating cover, the current-collecting tab and the lead are less likely to be disconnected from each other even when vibration or shock is applied to the battery. Therefore, this prevents short-circuit caused by the lead coming into contact with the wound electrode group 2. In addition, this makes it less likely to detach the insulating cover itself from the end portion of the wound electrode group 2. In addition, the insulating cover reduces movement of the wound electrode group 2 within the battery. This prevents the current-collecting tab from being deformed or damaged, and disconnected from the lead. Therefore, this more reliably ensures insulation between the leads, the current-collecting tabs, and the outer can.

As shown in FIGS. 6 and 7, the positive/negative electrodes insulating covers 25, 26 engaged with the end portions of the wound electrode group 2 are fixed to the insulating tape 30 using insulating cover fixing tapes 27. In order to prevent increase of the thickness, design is preferably made such that the positive/negative electrodes insulating covers 25, 26 do not overlap the insulating tape 30. Alternatively, design may be made such that the positive/negative electrodes insulating covers 25, 26 overlap the insulating tape 30, so that the insulating covers are fixed without using the insulating cover fixing tape 27.

Since the wound electrode group 2 is covered with the insulating tape 30 and the insulating cover 25, the wound electrode group 2 can be easily inserted into the outer can 1. This configuration prevents the wound electrode group 2 from being damaged when it is inserted into the outer can 1.

Since insertion is easy, the electrode group can be made in a size close to the internal size of the outer can 1, which improves the volumetric efficiency. Insulation of the wound electrode group 2 is ensured only by the insulating cover 25 and the insulating tape 30, and therefore, the number of components needed for insulation can be reduced, and the volume of the insulating members can be reduced. This can increase the volume of the wound electrode group 2 that can be accommodated in the outer can 1, and can improve the volumetric efficiency.

Resins usable as a base material of the insulating tape 30 can be chosen from, for example, polyester (PET), polyimide, polyphenylene sulfide (PPS), and polypropylene.

For example, the lid 5 is made of metal such as aluminum, aluminum alloy, iron, and stainless steel. The lid 5 and the outer can 1 are preferably formed from the same type of metal.

After the lid 5 is fixed to the outer can 1, electrolyte (not shown) is injected through an inlet 28 provided in the lid 5. After the injection, the flat electrode group 2 is impregnated with the electrolyte.

It should be noted that the sandwiching member of the insulating cover is not limited to the shape protruding to the inner side from the sidewall of the U-shaped member. For example, a sandwiching member having a recessed portion may be used so that the fixing member and the sandwiching strips of the lead engaged with the fixing member are inserted into the recessed portion.

Figure 8:
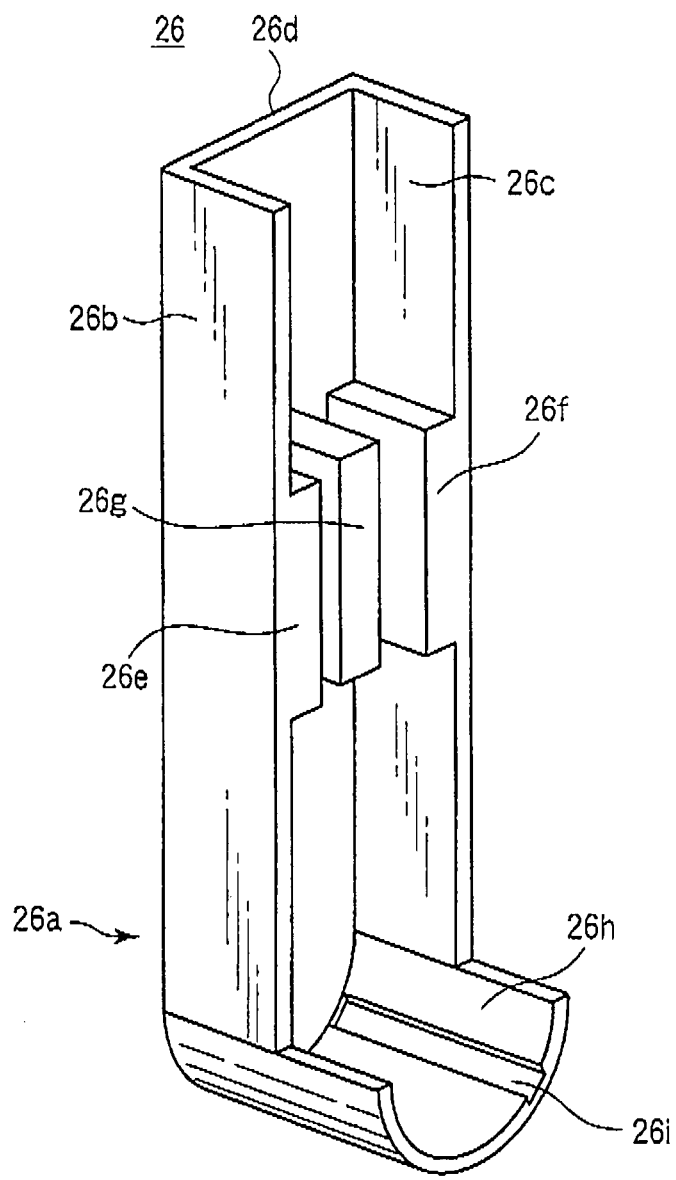
FIG. 8 is a perspective view illustrating a first modification of an insulating cover used for the battery according to the first embodiment.

Subsequently, a first modification of the insulating cover (e.g., negative electrode insulating cover 26) is shown in FIG. 8. In this modification, the same configurations as those of the above insulating cover 26 are denoted with the same reference numerals as those of FIG. 5, and description thereabout is omitted.

The insulating cover 26 as shown in FIG. 8 has an extending portion 26h provided at a bent portion of a lower of a U-shaped member 26a, and the extending portion 26h extends in a direction opposite to the back surface member 26d. Further, the extending portion 26h has one or more channel grooves 26i extending in parallel with the extending portion 26h.

Figure 9:
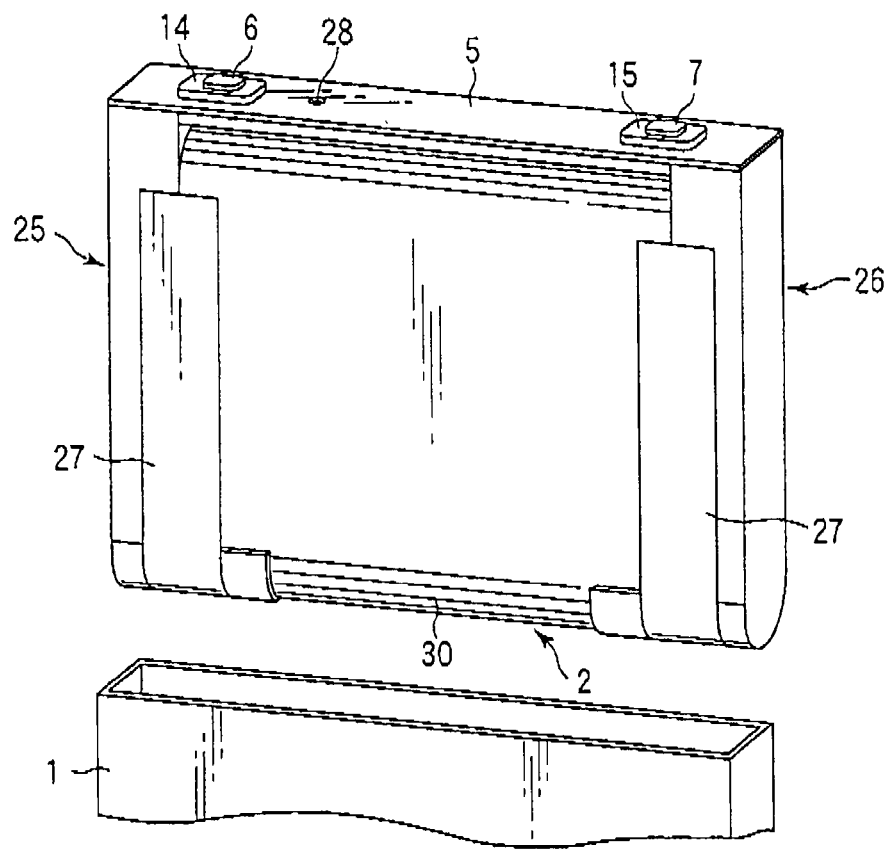
FIG. 9 is a perspective view illustrating how an electrode group of a battery using the insulating cover of FIG. 8 is received in an outer can.

Since the wound electrode group 2 is held by the extending portion 26h, as shown in FIG. 9, the insulating cover 26 according to this modification is fixed to the wound electrode group 2 more rigidly. Further, the channel grooves 26i also function as inflow paths of electrolyte. When the wound electrode group 2 is accommodated in the outer can 1, and the electrolyte is injected, the electrolyte flows into the wound electrode group 2 via the channel grooves 26i. This can accelerate impregnation of the electrolyte into the wound electrode group 2.

Figure 10:
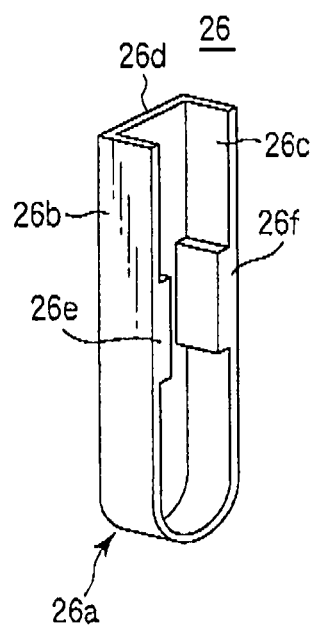
FIG. 10 is a perspective view illustrating a second modification of an insulating cover used for the battery according to the first embodiment.

Subsequently, a second modification of the insulating cover (e.g., negative electrode insulating cover 26) is shown in FIG. 10. In this modification, the same configurations as those of the above insulating cover 26 are denoted with the same reference numerals as those of FIG. 5, and description thereabout is omitted.

In the negative electrode insulating cover 26 as shown in FIG. 10, the sandwiching member comprises first and second rectangular thick portions 26e, 26f respectively arranged in proximity to central portions of the first and second sidewalls 26b, 26c.

According to the battery of the first embodiment explained above, the leads, the current-collecting tabs of the wound electrode group, and the outer can are prevented from coming into contact with each other, and when the lead and the current-collecting tab or the fixing member are disconnected due to vibration, shock, or the like, the lead is prevented from coming into contact with the wound electrode group and causing short circuit. Therefore, the highly safe sealed secondary battery can be provided.

It should be noted that the insulating cover having the above shape is not limited to the negative electrode insulating cover. It may be used as the positive electrode insulating cover.

Second Embodiment

Figure 11:
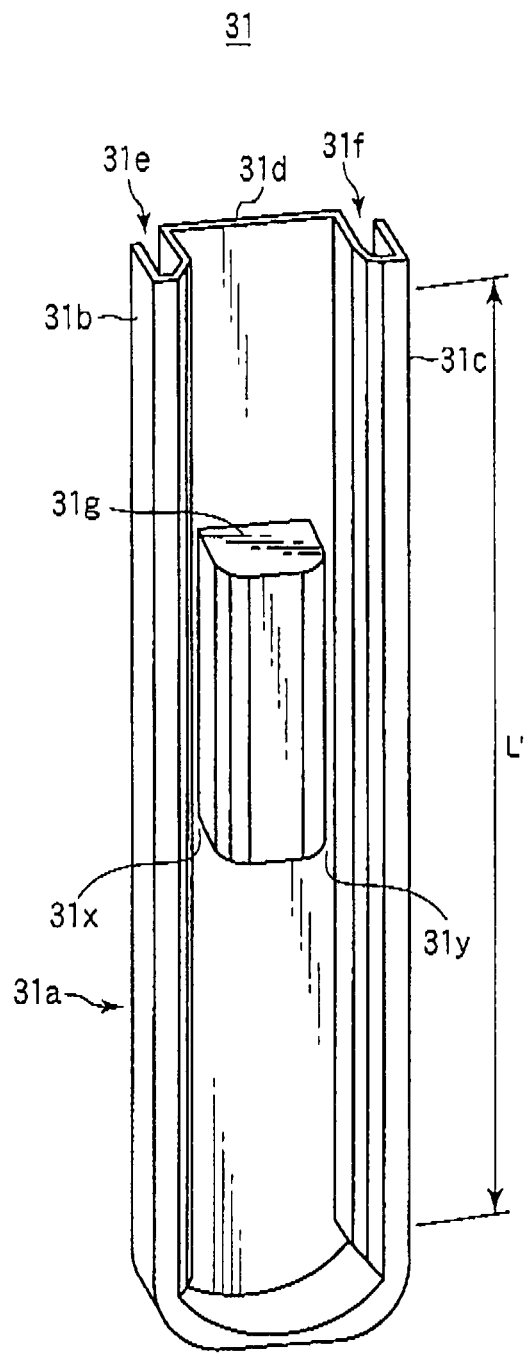
FIG. 11 is a perspective view illustrating an insulating cover used for a battery according to a second embodiment.

The battery according to the second embodiment has the same configuration as the first embodiment except for change in the shape of the insulating cover. FIG. 11 illustrates a negative electrode insulating cover 31 used in the present embodiment. In the explanation below, the negative electrode insulating cover is explained as an example. However, the positive electrode insulating cover also has the same shape and is arranged symmetrically with the negative electrode insulating cover.

In the present embodiment, the insulating cover 31 comprises a U-shaped member 31a, a back surface member 31d, and a sandwiching member. The U-shaped member 31a has first and second sidewalls 31b, 31c facing each other. The back surface member 31d is integrated with the back surface of the U-shaped member 31a. The sandwiching member sandwiches the negative electrode current-collecting tab 9a and the first and second sandwiching strips 4c, 4d of the negative electrode-lead 4. A lower portion of the U-shaped member 31a is bent, and an upper portion thereof is open. The U-shaped member 31a is made such that the side opposite to the back surface member 31d is also open.

The sidewalls 31b, 31c arranged to face each other in the U-shaped member 31a are bent to the outside about 180 degrees. First and second thick portions 31e, 31f are formed by those sidewalls 31b, 31c. Accordingly, the thick portions 31e, 31f are provided on the substantially entire length of the insulating cover 31 in the vertical direction.

The back surface member 31d has a rectangular protruding portion 31g. The protruding portion 31g is provided with predetermined clearances (a first clearance 31x, a second clearance 31y) respectively between the first and second thick portions 31e, 31f. The length of protrusion of the protruding portion 31g from the back surface member 31d is less than the width of the U-shaped member 31a. In this case, the width of the U-shaped member 31a means a length from the back surface member 31d to the end portions at the electrode group side in the sidewalls 31b, 31c. The protruding portion 31g is provided at the same height as the fixing member 12 attached to the current-collecting tab of the wound electrode group 2. For example, the protruding portion 31g has a shape of a square pole in which corners in a longitudinal direction are chamfered. It should be noted that the protruding portion 31g may be in a hollow shape.

The sandwiching member comprises these first and second thick portions 31e, 31f and the protruding portion 31g.

In the thick portions 31e, 31f, a length (L') of the insulating cover 31 in the vertical direction is longer than a length (L) of the fixing member 12. Therefore, the thick portions 31e, 31f of the sandwiching member can hold not only the joint portion between the sandwiching strips 4c, 4d of the negative electrode-lead 4 and the coupling portions 12a, 12b of the fixing member 12 but also the sandwiching strips 4c, 4d above the joint portion and the negative electrode current-collecting tab 9a below the joint portion. Therefore, the joint portion between the sandwiching strips of the lead and the fixing member can be held more rigidly. Moreover, the insulating cover 31 is less likely to be detached.

According to the battery using the insulating covers having the shape as described above, the insulating covers are less likely to be detached from the wound electrode group 2, and the joint portion between the sandwiching strips of the lead and the fixing member can be held more rigidly. Therefore, the highly safe sealed secondary battery can be provided.

Figure 12:
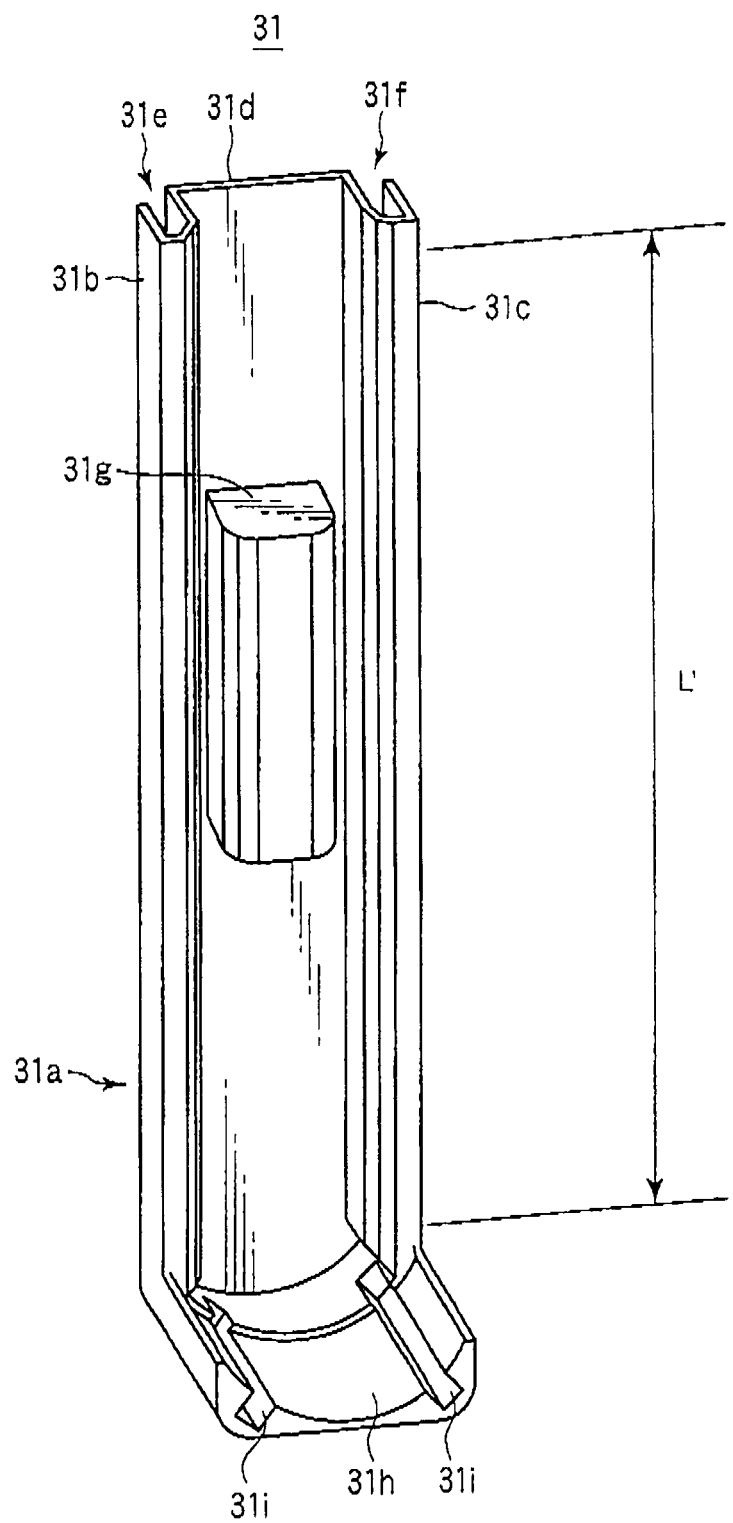
FIG. 12 is a perspective view illustrating a first modification of the insulating cover used for the battery according to the second embodiment.

Subsequently, a first modification of the insulating cover will be shown in FIG. 12. The insulating cover 31 as shown in FIG. 12 has an extending portion 31h provided at a bent portion of a lower of a U-shaped member 31a, and the extending portion 31h extends in a direction opposite to the back surface member 31d. Further, the extending portion 31h has one or more channel grooves 31i extending in parallel with the extending portion 31h.

Since the wound electrode group 2 is held by the extending portion 31h, the insulating cover 31 according to the first modification is fixed to the wound electrode group 2 more rigidly. Further, the channel grooves 31i also function as inflow paths of electrolyte. When the wound electrode group 2 is accommodated in the outer can 1, and the electrolyte is injected, the electrolyte flows into the wound electrode group 2 via the channel grooves 31i. This accelerates impregnation of the electrolyte into the wound electrode group 2.

Subsequently, a second modification of the insulating cover will be shown in FIG. 13. In the insulating cover 31 as shown in FIG. 13, the protruding portion 31g has three penetrating holes 31j penetrating from the outside of the back surface member 31d to the surface at the side of the wound electrode group. For example, the penetrating holes 31j are arranged at regular intervals on the surface of the protruding portion 31g.

Since the penetrating holes 31j exist in the protruding portion 31g, this accelerates flow of the electrolyte into the inside of the insulating cover 31. This accelerates impregnation of the electrolyte. Therefore, the productivity of the batteries can be improved. In addition, gases leaked out of the inside of the wound electrode group can be smoothly moved to the outside of the insulating cover 31. This prevents the insulating cover 31 from being detached by the gas pressure.

In FIG. 13, the three penetrating holes 31j are arranged at regular intervals, but the arrangement is not limited thereto. At least one penetrating hole may be arranged. Alternatively, in a case where a plurality of penetrating holes are arranged, they are not required to be arranged at regular intervals, and each may be arranged at any position. The protruding portion 31g having the penetrating holes may be formed by forming the insulating cover by stamping mold.

Figure 14:
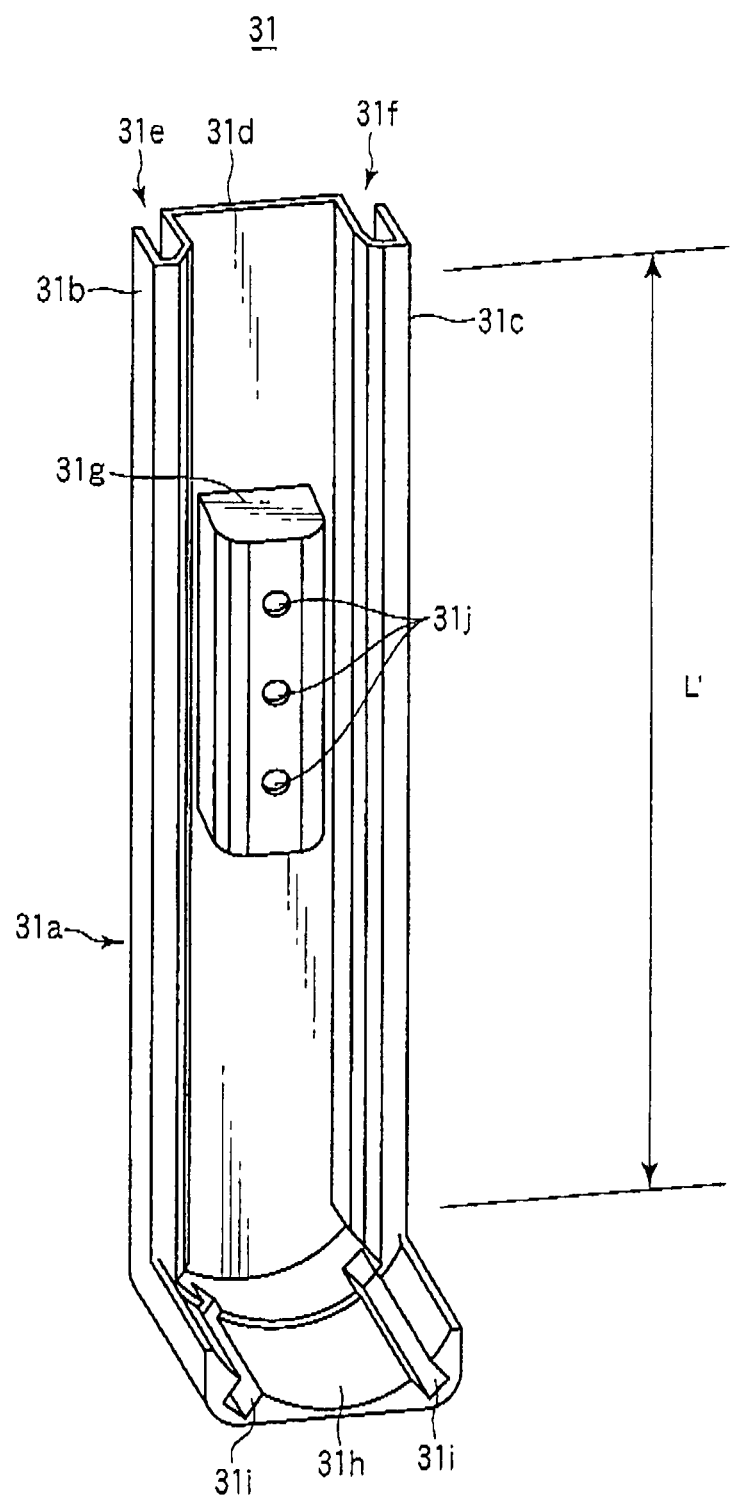
FIG. 14 is a perspective view illustrating a third modification of the insulating cover used for the battery according to the second embodiment.

Subsequently, a third modification of the insulating cover will be shown in FIG. 14. The insulating cover 31 as shown in FIG. 14 has an extending portion 31h provided at a bent portion of a lower of a U-shaped member 31a, and the extending portion 31h extends in a direction opposite to the back surface member 31d. The extending portion 31h has one or more channel grooves 31i extending in parallel with the extending portion 31h. The protruding portion 31g has three penetrating holes 31j penetrating from the outside of the back surface member 31d to the surface at the side of the wound electrode group. For example, the penetrating holes 31j are arranged at regular intervals on the surface of the protruding portion 31g.

Since the wound electrode group 2 is held by the extending portion 31h, the insulating cover 31 according to the third modification is fixed to the wound electrode group 2 more rigidly. Further, the channel grooves 31i also function as inflow paths of electrolyte. When the wound electrode group 2 is accommodated in the outer can 1, and the electrolyte is injected, the electrolyte flows into the wound electrode group 2 via the channel grooves 31i. This accelerates impregnation of the electrolyte into the wound electrode group 2. Since the penetrating holes 31j exist in the protruding portion 31g, this accelerates flow of the electrolyte into the inside of the insulating cover 31. This accelerates impregnation of the electrolyte. Therefore, the productivity of the batteries can be improved. In addition, gases leaked out of the inside of the wound electrode group can be smoothly moved to the outside of the insulating cover 31. This prevents the insulating cover 31 from being detached by the gas pressure.

Figure 15:
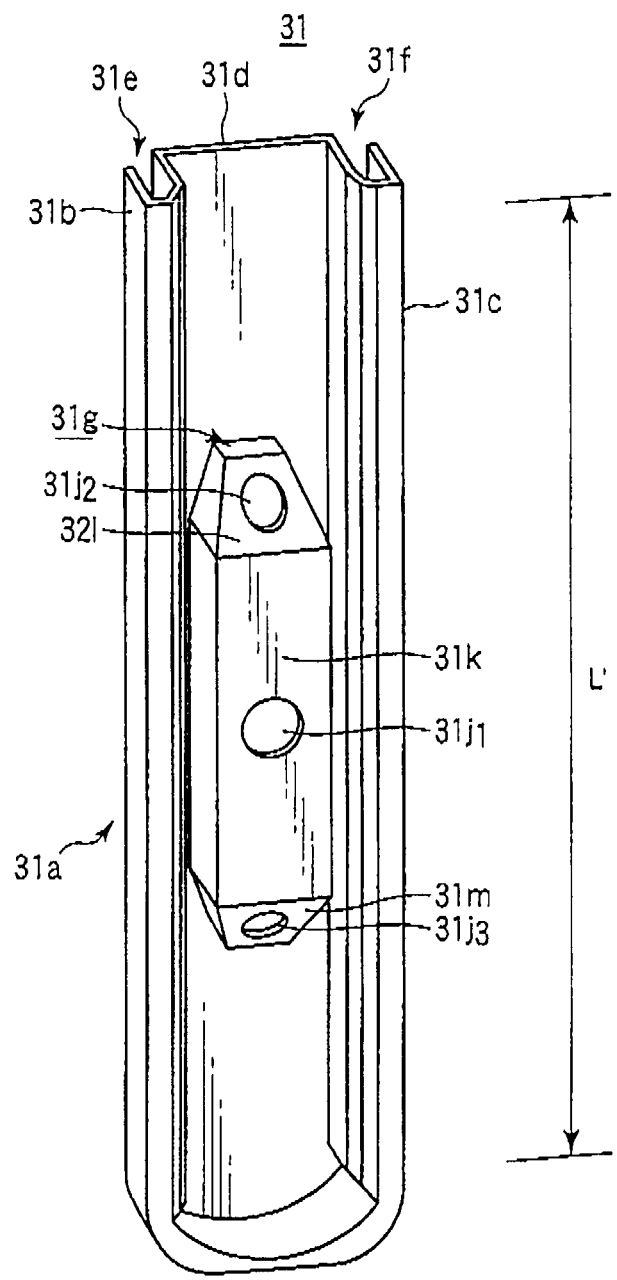
FIG. 15 is a perspective view illustrating a fourth modification of the insulating cover used for the battery according to the second embodiment.

Subsequently, a fourth modification of the insulating cover will be shown in FIG. 15. In the insulating cover 31 as shown in FIG. 15, the protruding portion 31g has a central portion 31k, an upper portion 31L in a pyramid shape, and a lower portion 31m in an inverted-pyramid shape. The central portion 31k, the upper portion 31L, and the lower portion 31m respectively have penetrating holes $31j_1$, $31j_2$, and $31j_3$ penetrating from the outside of the back surface member 31d to the surface at the side of the wound electrode group.

Since the protruding portion 31g has the lower portion 31n in the inverted-pyramid shape, and the lower portion 31n has the penetrating hole $31j_3$, the electrolyte smoothly flows into the inside of the insulating cover 31. Therefore, the wound electrode group can be quickly impregnated with the electrolyte. Therefore, the productivity of the batteries can be improved. The upper portion 31L in the pyramid shape makes a clearance between the protruding portion 31g and the fixing member, and gases leaked out of the inside of the wound electrode group can be more smoothly moved from the penetrating hole $31j_2$ of the upper portion 31L to the outside of the insulating cover. This prevents the insulating cover 31 from being detached by the gas pressure.

It should be noted that the shape of the upper portion 31L is not limited to the pyramid shape, and may be formed in any shape. The shape of the lower portion 31m is not limited to the inverted-pyramid shape, and may be in any shape as long as the lower is tapered toward the end.

Each of the central portion 31k, the upper portion 31L, and the lower portion 31m has one penetrating hole 31j, but each may have a plurality of penetrating holes.

Subsequently, a fifth modification of the insulating cover will be shown in FIG. 16. The insulating cover 31 as shown in FIG. 16 has an extending portion 31h provided at a bent portion of a lower of a U-shaped member 31a, and the extending portion 31h extends in a direction opposite to the back surface member 31d. The extending portion 31h has one or more channel grooves 31i extending in parallel with the extending portion 31h. The protruding portion 31g has a central portion 31k, an upper portion 31L in a pyramid shape, and a lower portion 31m in an inverted-pyramid shape. The central portion 31k, the upper portion 31L, and the lower portion 31m respectively have penetrating holes $31j_1$, $31j_2$, and $31j_3$ penetrating from the outside of the back surface member 31d to the surface at the side of the wound electrode group.

Since the wound electrode group 2 is held by the extending portion 31h, the insulating cover 31 according to the fifth modification is fixed to the wound electrode group 2 more rigidly. Further, the channel grooves 31i also function as inflow paths of electrolyte. When the wound electrode group 2 is accommodated in the outer can 1, and the electrolyte is injected, the electrolyte flows into the wound electrode group 2 via the channel grooves 31i. This accelerates impregnation of the electrolyte into the wound electrode group 2.

Since the protruding portion 31g has the lower portion 31n in the inverted-pyramid shape, and the lower portion 31n has the penetrating hole 31j₃, the electrolyte smoothly flows into the inside of the insulating cover 31. Therefore, the wound electrode group can be quickly impregnated with the electrolyte. Therefore, the productivity of the batteries can be improved. The upper portion 31L in the pyramid shape makes a clearance between the protruding portion 31g and the fixing member, and gases leaked out of the inside of the wound electrode group can be more smoothly moved from the penetrating hole 31j₂ of the upper portion 31L to the outside of the insulating cover. This prevents the insulating cover 31 from being detached by the gas pressure.

In the battery according to the present embodiment, the insulating cover having the same shape as the insulating cover at the negative electrode may be attached to the positive electrode of the wound electrode group 2, or an insulating cover having a different shape may be attached thereto.

Third Embodiment

A battery according to the third embodiment will be described with reference to FIGS. 17 and 18. The battery of the third embodiment has a similar configuration to that of the first embodiment except that the shapes of the positive/negative electrode-leads and the positive/negative electrode insulating cover differ from those described above. In the descriptions below, the same reference numerals or symbols as used above will be used to indicate similar or corresponding structural elements, and a detailed description of such elements will be omitted.

A positive electrode-lead 3' comprises: a connection plate 3'a serving as a connection portion connected to a positive electrode terminal 6; a penetrating hole 3'b formed in the connection plate 3'a; and an extending portion 3'c extending from the connection plate 3'a toward a wound electrode group 2 in a direction perpendicular to the winding axis of the wound electrode group 2 and connected to a wound positive electrode current-collecting tab 8a.

A negative electrode-lead 4' comprises: a connection plate 4'a serving as a connection portion connected to a negative electrode terminal 7; a penetrating hole 4'b formed in the connection plate 4'a; and an extending portion 4'c extending from the connection plate 4'a toward the wound electrode group 2 in a direction perpendicular to the winding axis of the wound electrode group 2 and connected to a wound negative electrode current-collecting tab 9a.

A positive electrode insulating cover 32 comprises: a U-shaped member 32a that has first and second sidewalls 32b, 32c facing each other, a back surface member 32d, and a sandwiching member configured to sandwich a positive electrode current-collecting tab 8a and the extending portion 3'c of the positive electrode-lead connected thereto. The sandwiching member comprises rectangular thick portions 32e and 32f provided at the first and second sidewalls 32b and 32c facing each other.

In the positive electrode insulating cover 32 of the above configuration, thick portion 32e is in contact with the extending portion 3'c of the positive electrode-lead 3'c, which engages with the positive electrode current-collecting tab 8a. On the other hand, thick portion 32f is in contact with the first holding unit 11a of a fixing member 11. Therefore, the positive electrode current-collecting tab 8a and the extending portion 3'c of the positive electrode-lead are sandwiched between thick portions 32e and 32f. Since the extending portion 3'c of the positive electrode-lead is located on only one side of the positive electrode current-collecting tab 8a, thick portion 32e may be thinner than thick portion 32f.

A negative electrode insulating cover 33 has a similar configuration to that of the positive electrode insulating cover and is arranged in symmetric thereto.

The positive and negative electrode-leads having the above configuration are light in weight, and do not occupy much volume inside the outer can. This feature contributes to the reduction of the weight of the battery and to high energy density.

FIG. 18 shows a modification of the positive electrode insulating cover used in the third embodiment. The insulating cover 32 comprises a rectangular protruding portion 32g provided on the back surface member 32d. The protruding portion 32g is located between thick portions 32e and 32f, and the length from the back surface member 32d to a surface opposite thereto is less than the width of the sidewalls 32b, 32c of the U-shaped member. The sandwiching member comprises the first and second thick portions 32e and 32f as well as the protruding portion 32g.

The protruding portion 32g may have a penetration hole, as described in connection with the second embodiment.

As described in connection with the second embodiment, the positive electrode insulating cover may be modified such that the first and second sidewalls of the U-shaped member may be bent outwardly. In this case, the sandwiching member of the positive electrode insulating cover comprises the bent portions of the sidewalls. Furthermore, the positive electrode insulating cover may comprise a bent sidewall and a rectangular protruding portion provided on the back surface member. In this case, the sandwiching member comprises the bent portion of the sidewalls and the protruding portion.

The insulating cover used in the embodiment may be designed such that the U-shaped member comprises an extending portion that extends from the bent portion in a direction opposite to the back surface member.

The above description was given, referring to the positive electrode insulating cover. Needless to say, the negative electrode insulating cover may have a similar shape to that of the positive electrode insulating cover, and may be arranged to be symmetric with respect to the positive electrode insulating cover.

(Positive/Negative Electrode Terminals)

Materials of positive/negative electrode terminals that can be used in the battery according to the first to the third embodiments will be explained. In a case of a lithium ion secondary battery in which carbon-based materials are used as negative electrode active materials, aluminum or aluminum alloy is usually used as a material for the positive electrode terminal. In addition, metal such as copper, nickel, and nickel-plated iron are used as materials for the negative electrode terminal. In a case where a lithium titanate is used as a negative electrode active material, not only the above materials but also aluminum or aluminum alloy may be used as materials for the negative electrode terminal. When aluminum or aluminum alloy is used for the positive/negative electrode terminals, the positive/negative electrode current-collecting tabs, the positive/negative electrode fixing members, and the positive/negative electrode-leads are preferably made of aluminum or aluminum alloy.

(Positive Electrode)

Subsequently, a positive electrode that can be used in the battery according to the first to the third embodiments will be explained.

For example, the positive electrode is made by applying slurry containing positive electrode active materials to a current-collecting body made of aluminum foil or aluminum alloy foil and drying the slurry. The positive electrode active materials are not particularly limited. For example, oxides, sulfides, and polymers capable of absorbing and releasing lithium can be used as the positive electrode active materials. Examples of preferred active materials include lithium manganese oxide compound, lithium nickel composite oxide, lithium cobalt complex oxide, and lithium iron phosphate, which are capable of providing high positive electrode potential.

(Negative Electrode)

Subsequently, a negative electrode that can be used in the battery according to the first to the third embodiments will be explained.

For example, the negative electrode is made by applying slurry containing negative electrode active materials to a current-collecting body made of aluminum foil or aluminum alloy foil and drying the slurry. The negative electrode active materials are not particularly limited. For example, metal oxides, metal sulfides, metal nitrides, and alloys capable of absorbing and releasing lithium can be used as the negative electrode active materials. Materials having a lithium ion absorbing and releasing potential nobler by 0.4 V or more than the metal lithium potential are preferably used. Negative electrode active materials having such a lithium ion absorbing and releasing potential suppress a reaction between aluminum or an aluminum alloy and lithium, which enables aluminum or an aluminum alloy to be used for the negative electrode current-collecting body and structural members related to the negative electrode. Examples of the negative electrode active material include titanium oxides, lithium-titanium complex oxides such as lithium titanate, tungsten oxides, amorphous tin oxides, tin-silicon oxides and silicon oxides, and among these compounds, lithium-titanium complex oxides are preferable.

(Separator)

Subsequently, a separator that can be used in the battery according to the first to the third embodiments will be explained. As the separator, microporous membranes, woven fabrics, and nonwoven fabrics or combinations of two or more of these materials may be used. The laminated material may be made of the same material or different materials. Examples of the material used to form the separator may include polyethylene, polypropylene, ethylene/propylene copolymer, and ethylene/butene copolymer.

(Electrolyte)

Subsequently, an electrolyte that can be used in the battery according to the first to the third embodiments will be explained.

A non-aqueous electrolyte solution prepared by dissolving an electrolyte (for example, lithium salt) in a non-aqueous solvent is used as an electrolyte. Examples of a non-aqueous solvents include ethylene carbonate (EC), propylene carbonate (PC), butylene carbonate (BC), dimethle carbonate (DMC), dietyle carbonate (DEC), ethyl methyl carbonate (EMC), gamma-butyro lactone (gamma-BL), sulfolane, acetonitrile, 1,2-dimethoxy ethane, 1,3-dimethoxy propane, dimethyl ether, a tetra-hydro franc (THF), and a 2-methyl tetra-hydro franc. The non-aqueous solvent may be used independently, or two or more solvents may be mixed.

Examples of electrolytes include lithium salts such as lithium perchlorate ($LiClO_4$), 6-fluoridation perphosphoric acid lithium ($LiPF_6$), 4-fluoridation-lithium-borate ($LiBF_4$), 6-fluoridation-arsenic lithium ($LiAsF_6$), and trifluoro-metasulfonic acid lithium ($LiCF_3SO_3$). The electrolyte may be used independently, or two or more electrolytes may be mixed. The electrolyte amount of dissolutions to an electrolytic non-aqueous solvent is preferably set to 0.2 mol/L to 3 mol/L.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A battery comprising:

a metallic outer can;

a wound electrode group accommodated in the outer can in a direction perpendicular to a winding axis, wherein a wound positive electrode current-collecting tab is provided at one end of the wound electrode group, and a wound negative electrode current-collecting tab is provided at an other end of the wound electrode group;

a positive electrode-lead connected to the positive electrode current-collecting tab;

a negative electrode-lead connected to the negative electrode current-collecting tab;

a metallic lid comprising a positive electrode terminal and a negative electrode terminal and being attached to an opening portion of the outer can;

a positive electrode insulating cover engaged with one end portion including the positive electrode current-collecting tab of the wound electrode group; and a negative electrode insulating cover engaged with the other end portion including the negative electrode current-collecting tab of the wound electrode group, wherein the positive electrode-lead comprises a connection portion connected to the positive electrode terminal and first and second sandwiching portions that extend from the connection portion to the wound electrode group in the direction perpendicular to the winding axis to sandwich the wound positive electrode current-collecting tab, the negative electrode-lead comprises a connection portion connected to the negative electrode terminal and first and second sandwiching portions that extend from the connection portion to the wound electrode group in the direction perpendicular to the winding axis to sandwich the wound negative electrode current-collecting tab, the positive electrode insulating cover comprises a U-shaped member that has first and second sidewalls facing each other, a back surface member, and a sandwiching member configured to sandwich the first sandwiching portion of the positive electrode-lead and the wound positive electrode current-collecting tab portion that faces the first sandwiching portion and sandwich the second sandwiching portion of the positive electrode-lead and the positive electrode current-collecting tab portion that faces the second sandwiching portion, the positive electrode insulating cover comprises a rectangular protruding portion that is provided on the back surface member and that is located in a hollow of the wound positive electrode current-collecting tab, the negative electrode insulating cover comprises a U-shaped member that has first and second sidewalls facing each other, a back surface member, and a sandwiching member configured to sandwich the first sandwiching portion of the negative electrode-lead and the wound negative electrode current-collecting tab portion that faces the first sandwiching portion and sandwich the second sandwiching portion of the negative electrode-lead and the negative electrode current-collecting tab portion that faces the second sandwiching portion, and the negative electrode insulating cover comprises a rectangular protruding portion that is provided on the back surface member and that is located in a hollow of the wound negative electrode current-collecting tab.

2. The battery according to claim 1, wherein each of the sandwiching members of the positive electrode insulating cover and the negative electrode insulating cover comprises:

a rectangular portion provided on each of the first and second sidewalls facing each other.

3. The battery according to claim 2, wherein the protruding portion is located between the rectangular portions, and a length from the back surface member to a surface opposite thereto is less than a width of the sidewall of the U-shaped member.

4. The battery according to claim 2, wherein the protruding portion comprises a penetrating hole.

5. The battery according to claim 1, wherein the first and second sidewalls, which face each other, of the U-shaped member of each of the positive electrode insulating cover and the negative electrode insulating cover are bent outwardly, each of the sandwiching members of the positive electrode insulating cover and the negative electrode insulating cover comprises bent sidewalls.

6. The battery according to claim 5, wherein each of the sandwiching members of the positive electrode insulating cover and the negative electrode insulating cover comprises bent sidewalls, and the protruding portion is located between the bent sidewalls, and a length from the back surface member to a surface opposite thereto is less than a width of the sidewall of the U-shaped member.

7. The battery according to claim 6, wherein the protruding portion comprises a penetrating hole.

8. The battery according to claim 1, wherein the U-shaped member of each of the positive electrode insulating cover and the negative electrode insulating cover comprises an extending portion that extends from a bent portion in a direction opposite to the back surface member.

9. The battery according to claim 8, wherein the extending portion comprises a channel groove that extends in parallel with the extending portion.

10. A battery comprising:

a metallic outer can;

a wound electrode group accommodated in the outer can in a direction perpendicular to a winding axis, wherein a wound positive electrode current-collecting tab is provided at one end of the wound electrode group, and a wound negative electrode current-collecting tab is provided at the other end of the wound electrode group;

a positive electrode-lead connected to the positive electrode current-collecting tab;

a negative electrode-lead connected to the negative electrode current-collecting tab;

a metallic lid comprising a positive electrode terminal and a negative electrode terminal and being attached to an opening portion of the outer can;

a positive electrode insulating cover engaged with one end portion including the positive electrode current-collecting tab of the wound electrode group; and a negative electrode insulating cover engaged with the other end portion including the negative electrode current-collecting tab of the wound electrode group, wherein the positive electrode-lead comprises a connection portion connected to the positive electrode terminal, and an extending portion extending from the connection portion toward the wound electrode group in a direction perpendicular to the winding axis of the wound electrode group and connected to the wound positive electrode current-collecting tab, the negative electrode-lead comprises a connection portion connected to the negative electrode terminal and an extending portion extending from the connection portion toward the wound electrode group in a direction perpendicular to the winding axis of the wound electrode group and connected to the wound negative electrode current-collecting tab, the positive electrode insulating cover comprises a U-shaped member that has first and second sidewalls facing each other, a back surface member, and a sandwiching member configured to sandwich the positive electrode current-collecting tab and the extending portion of the positive electrode-lead connected thereto, the positive electrode insulating cover comprises a rectangular protruding portion that is provided on the back surface member and that is located in a hollow of the wound positive electrode current-collecting tab, the negative electrode insulating cover comprises a U-shaped member that has first and second sidewalls facing each other, a back surface member, and a sandwiching member configured to sandwich the negative electrode current-collecting tab and the extending portion of the negative electrode-lead connected thereto, and the negative electrode insulating cover comprises a rectangular protruding portion that is provided on the back surface member and that is located in a hollow of the wound negative electrode current-collecting tab.

11. The battery according to claim 10, wherein each of the sandwiching members of the positive electrode insulating cover and the negative electrode insulating cover comprises:

a rectangular portion provided on each of the first and second sidewalls facing each other.

12. The battery according to claim 11, wherein the protruding portion is located between the rectangular portions, and a length from the back surface member to a surface opposite thereto is less than a width of the sidewall of the U-shaped member.

13. The battery according to claim 12, wherein the protruding portion comprises a penetrating hole.

14. The battery according to claim 10, wherein the first and second sidewalls, which face each other, of the U-shaped member of each of the positive electrode insulating cover and the negative electrode insulating cover are bent outwardly, each of the sandwiching members of the positive electrode insulating cover and the negative electrode insulating cover comprises bent sidewalls.

15. The battery according to claim 14, wherein each of the sandwiching members of the positive electrode insulating cover and the negative electrode insulating cover comprises bent sidewalls, and the protruding portion is located between the bent sidewalls, and a length from the back surface member to a surface opposite thereto is less than a width of the sidewall of the U-shaped member.

16. The battery according to claim 15, wherein the protruding portion comprises a penetrating hole.

17. The battery according to claim 10, wherein the U-shaped member of each of the positive electrode insulating cover and the negative electrode insulating cover comprises an extending portion that extends from a bent portion in a direction opposite to the back surface member.

18. The battery according to claim 17, wherein the extending portion of the U-shaped member comprises a channel groove that extends in parallel with the extending portion of the U-shaped member.

\* \* \* \* \*